March 10, 1942.  W. E. WAGNER  2,275,705

HEAT TREATING APPARATUS

Filed Feb. 26, 1940   2 Sheets-Sheet 1

Inventor:
William E. Wagner
By Moriden, Davis & Cargill
Attys.

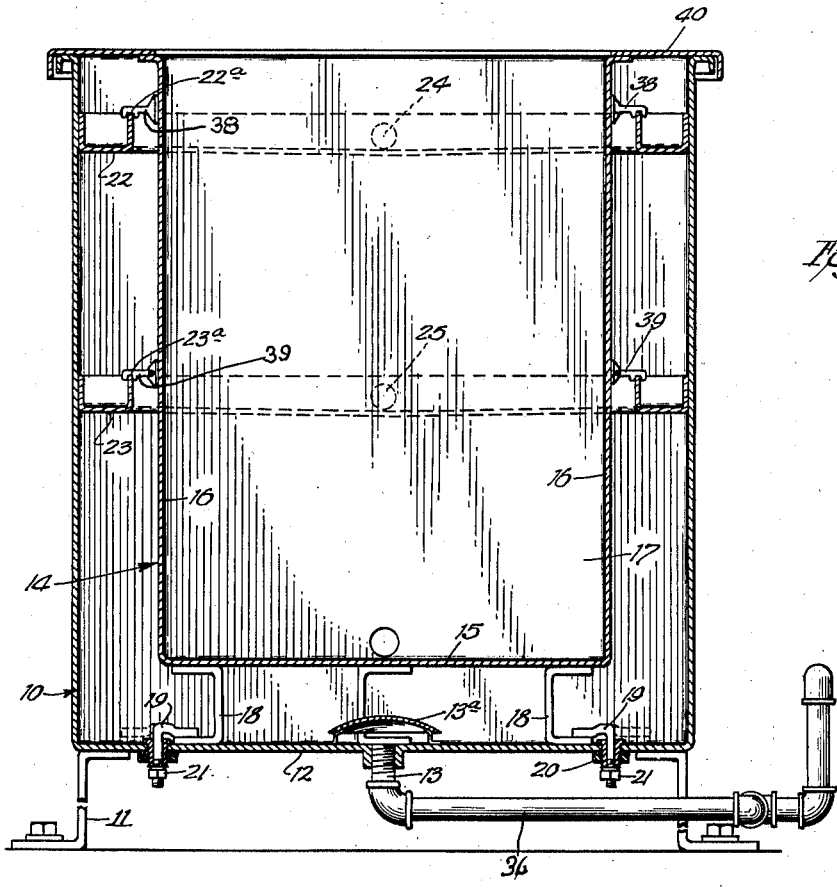
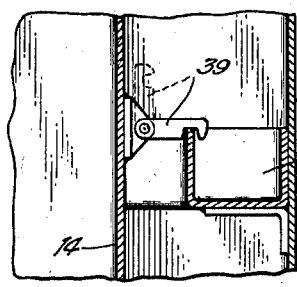

Patented Mar. 10, 1942

2,275,705

UNITED STATES PATENT OFFICE 2,275,705

HEAT TREATING APPARATUS

William E. Wagner, Chicago, Ill., assignor to Verley Products Corporation, Chicago, Ill., a corporation of Illinois Application February 26, 1940, Serial No. 320,977

2 Claims. (Cl. 257—208)

This invention relates to improvements in heat treating apparatus.

One object of the present invention is to provide a vat or heat treating apparatus having means whereby the level at which the heating water is discharged, and hence to which it rises along the side walls of the receptacle, can be controlled to correspond approximately with the level of the product in the receptacle when a full batch of product, or some particular portion of a full batch, is being treated, thereby avoiding excessive heating of those portions of the receptacle side walls which are above the level of the product and avoiding also subjecting such portions of the side walls of the receptacle to the inward pressure of the water which tends to deflect or bulge the walls inwardly.

Another object of the invention is to provide heat treating apparatus employing a circulating heat treating fluid which is caused to flow in predetermined paths to effect uniform results.

Another object of the invention is to provide apparatus of the character mentioned comprising an outer tank and an inner receptacle, the walls of the tank preferably being provided with a plurality of overflow water-return means located at different levels which stiffen the walls of the tank and to which the adjacent walls of the receptacle are attached for resisting deformation.

Other objects relate to various features of construction and arrangement of parts which will be apparent from a consideration of the following specification and accompanying drawings wherein—

Figure 3 is a section taken on line 3—3 of Figure 2; and

Figure 4 is an enlarged, broken section taken on line 4—4 of Figure 1.

Figure 1:
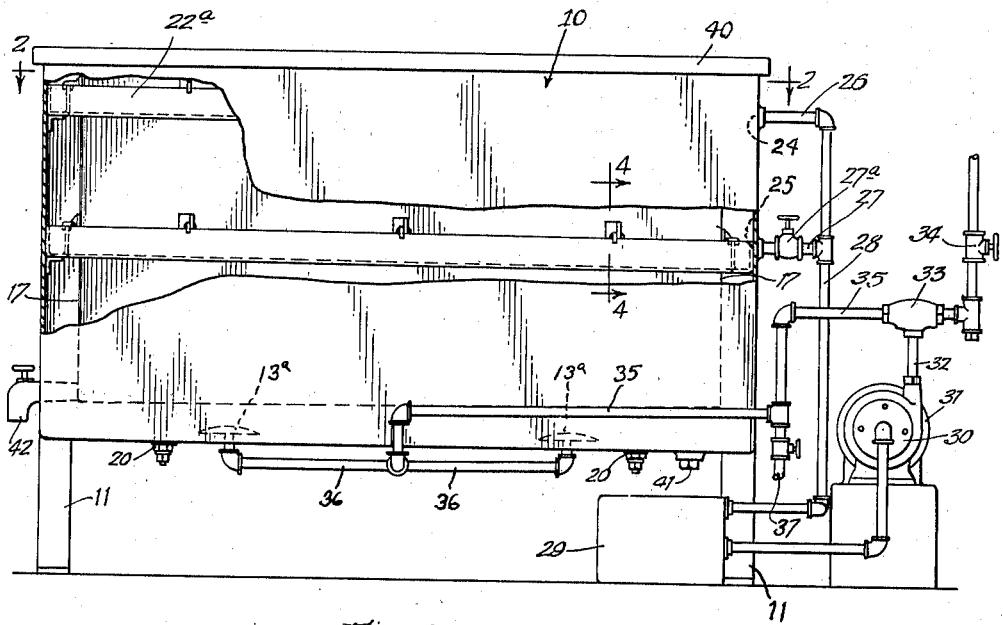
Figure 1 is a broken side elevation of apparatus embodying the present improvements.

In the drawings a tank indicated generally by the numeral 10 is provided with any suitable supports 11 and in the bottom wall 12 is provided with any suitable number of inlets, two being shown in the drawings and indicated by the numeral 13. Where the tank 10 is of greater capacity, a larger number of such inlets may be provided for effecting a more uniform initial distribution of the incoming fluid.

The product to be treated is placed in a receptacle 14 which, in the form illustrated, corresponds in shape with the tank 10 but is of such size that the bottom wall 15, side walls 16 and end walls 17 are substantially uniformly spaced from the corresponding walls of the tank. The receptacle 14 may appropriately be formed of sheet metal, such as stainless steel, the material depending on the product to be treated. Where milk products are to be treated, as in the making of cottage cheese, for example, stainless steel has been found satisfactory.

The receptacle 14 is shown in Figure 3 as being supported by U-shaped chairs or legs 18 which are preferably welded to the bottom 15 of the receptacle and rest on the wall 12 of the tank adjacent openings in the latter through which project suitable latching devices 19. The latches can be turned for engagement with the respective horizontal bases of the chairs (as from the dotted to the full line positions shown in Figure 3) and the clamps tightened to secure the receptacle against the buoyant action of the water or other heat transfer fluid employed. Suitable gaskets 20 around the stems of the latches prevent leakage after the latch nuts 21 have been tightened.

The spacing of the walls of the receptacle 14 from the corresponding walls of the tank provides a chamber surrounding the sides, ends and bottom wall of the receptacle through which water can be circulated for effecting a heat treatment of the receptacle contents. Water forced through the inlets 13 will rise to a level predetermined by the location of one or more discharge troughs located in such space. Two such troughs 22 and 23 are illustrated in the drawings, although more may be provided if desired.

The troughs preferably are secured to the walls of the tank and are of a horizontal width less than the distance between corresponding walls of the tank and the receptacle and hence do not prevent the rising of the water between the receptacle and the troughs.

The upper trough is located at approximately the level of the upper surface of the product in the tank when the latter carries a full load of batch.

The level of the lower trough 23 corresponds approximately to the level of a given portion of a full batch, such as half batch, for example.

Figure 2:
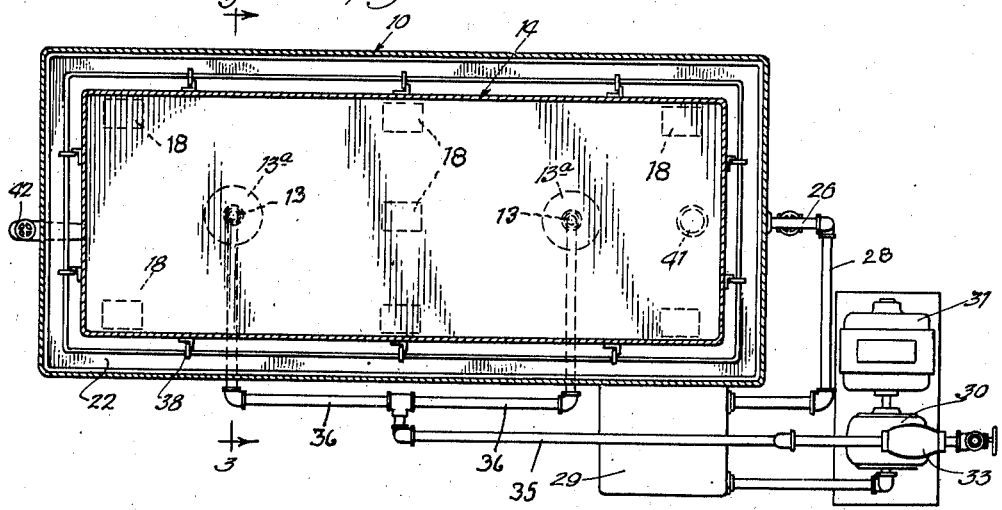
Figure 2 is a section taken on line 2—2 of Figure 1.

The troughs may be of the channel form illustrated, or other suitable construction, but preferably are such as to add rigidity to the structure for reasons mentioned below. Each trough extends without interruption around the inner walls of the tank and the upper edge 22a, 23a of the respective troughs are horizontal, although the bottoms 22b, 23b of the troughs are inclined slightly from the rear or left-hand end to the respective outlets 24 and 25 which communicate with the troughs at the right-hand end of the tank, as illustrated in Figures 1 and 2. The outlets 24 and 25 can discharge the water from the troughs through respective conduits 26 and 27, thence by pipe 28 to a reservoir 29 which is a part of the heating and circulating apparatus, or may be constructed as a part of the vat if desired. From the reservoir the fluid is drawn to the intake of a pump 30, which is operable by a motor 31 or other source of power. From the pump the water flows through pipe 32 to a mixing T 33 of known construction wherein steam under control of a valve 34 mixes with the water to heat it to the desired temperature. From the T 33 the water flows by pipe 35 and branches 36 to the inlets 13.

The pipe 35 may be provided with a valve controlled branch 37 connected to a water supply line by means of which the tank can be filled to the desired level for the treatment of a batch of material in the receptacle.

When a full batch of material is to be treated, a valve 27a in the pipe 27 is closed and sufficient water is admitted to the tank to fill the water circulation space surrounding the receptacle and causing the water to flow over the edge 22a into the trough 22 and through the pipes 26, 28 into the receptacle 29. This water may be preheated to the desired temperature if desired, or heated by the addition of steam thereto through valve 34. To circulate the water the motor 31 is started and the valve 34 adjusted to admit steam into the circulating water to heat it to the required temperature or to maintain it at that temperature. The pump forces the water through pipe 32 to the steam mixing chamber or T 33, thence through pipes 35 to the tank inlets 13 which may be provided with distributor caps or domes 13a which prevent the hot water from flowing directly against the bottom of the receptacle but which spread the incoming water streams radially to effect more uniform distribution of the heat to the receptacles. The circulating water flows radially outward from the inlets 13 along the bottom of the receptacle and upwardly in the vertical spaces at the sides and ends of the receptacle and overflows into the upper trough 22. Since the upper edge of the trough is horizontal, there will be a uniform flow of water into the trough throughout the length of the latter and hence a uniform distribution of heat to all sides of the receptacle. This arrangement thus avoids the creation of local currents in the water in the tank which would result in non-uniform distribution of heat to the product in the receptacle.

The buoyant effect of the water in the receptacles is resisted by the anchoring chairs 18. The tendency of the water on the exterior of the receptacle to press the side walls 16 and 17 of the receptacle inwardly is resisted by two rows of latches 38 and 39. The upper latches 38 may be welded to the exterior of the receptacle and have hook ends adapted to engage the adjacent wall of the trough 22. The latches 39 of the lower row are provided with a hinge construction as shown in Figure 4 which enables the latches to be raised as shown in dotted lines in said figure to clear the upper trough 22 as the receptacle is being lowered into the tank during the assembly of the apparatus. This construction adds rigidity to the walls of the receptacle as will be apparent, and resists inward deformation thereof which obstructs the free movement of cutting devices of the character above mentioned. A closure member 40 is provided at the top of the tank for closing the upper end of the water circulating passage. A drain 41 for the tank is shown in Figures 1 and 2 and a drain 42 for draining liquid, such as whey, from the receptacle 14.

If a smaller batch is to be treated in the receptacle the level of which corresponds approximately to the level of the trough 23, the tank is supplied with sufficient water whereby it will overflow into that trough during the operation of the pump, the valve 27a being then open. Steam is admitted to heat the water and maintain it, or restore it constantly, to the proper temperature, as above described.

In this instance of operation, however, the portion of the receptacle above the trough 23 will not be subjected to the heating action of the water, nor will it be subjected to the pressure of the water except to the approximate level of the product in the receptacle. Over-heating of the product adjacent the surface of the partial batch is thus prevented by this arrangement, as will be apparent, since substantially no heat is applied to the portions of the receptacle walls above the level of the contents.

Although two overflow or water-return troughs have been shown, it will be obvious that additional troughs at other levels may be employed where desired, whereby precise applications of heat can be effected with respect to the level of different quantities of material being treated. The uniform overflowing of the fluid from the surface thereof into a selected trough which corresponds in position to the level of the particular batch of material being treated prevents the development of currents in the fluid chamber tending to flow from the inlets 13 toward the outlets 24 or 25 of the tank and the non-uniform heating of the receptacle contents that would result therefrom.

In the foregoing description of the specific embodiment of the invention illustrated in the drawings, reference has been made to the use of hot water as the heating medium. It will be apparent that a cooling medium may be employed in the apparatus, as cold water, for example, for cooling a product if desired.

While I have shown and described one embodiment of the invention for the purpose of illustration, various changes may be made therein without departing from the spirit of the invention.

I claim:

1. Apparatus of the class described comprising a tank provided with an inlet in the lower portion thereof, a receptacle in said tank spaced therefrom to provide a fluid circulation chamber beneath the bottom and surrounding the side walls of the receptacle, a pair of troughs in said chamber secured to said tank and surrounding said receptacle at different elevations whereby fluid in the chamber is uniformly dischargeable into one or the other trough when the fluid in the chamber is at the level of the respective trough, outlets in a wall of said tank each communicating with one of said troughs, and an operable closure means for the outlet of the lower trough for selectively rendering one or the other of said troughs operable for maintaining the fluid in the circulating chamber at a corresponding level.

2. Apparatus of the class described comprising a tank, a receptacle therein having walls spaced from corresponding walls of the tank to provide a space between the tank and receptacle for heat transfer fluid, fluid inlet means in the lower portion of the tank, means for causing fluid to flow through said inlet means and to rise in said space in contact with the walls of the receptacle, and means for limiting the level to which fluid can rise in the tank comprising a plurality of open fluid discharge troughs in said space surrounding the receptacle and arranged at different elevations corresponding to selected levels of fluid in said space, each of said troughs having a horizontal fluid intake whereby the fluid in rising to the level of a trough may flow uniformly over the horizontal intake into the respective trough throughout the length thereof, outlets for the trough, and operable valve means for rendering one outlet or the other effective in discharging fluid from the respective trough.

WILLIAM E. WAGNER.